Oct. 17, 1944.   N. J. WEISER   2,360,626
COTTER PIN CONNECTION FOR NUTS AND BOLTS
Filed May 9, 1944
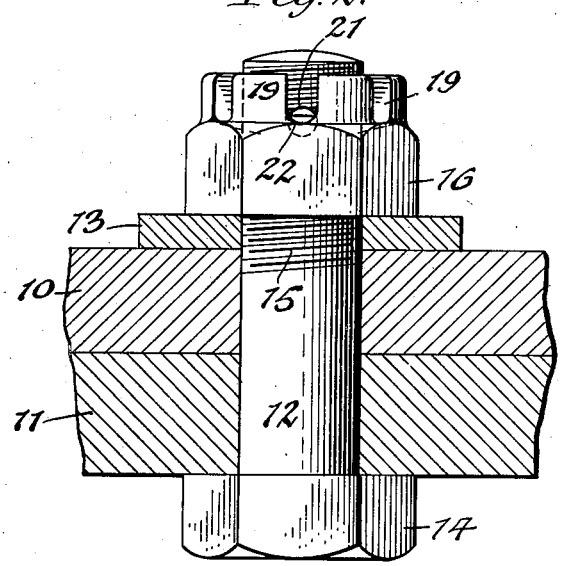
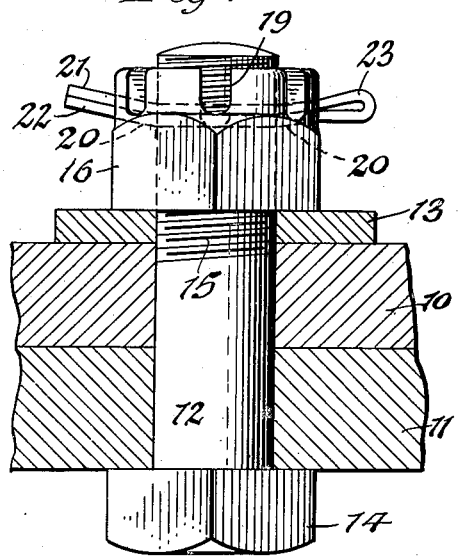
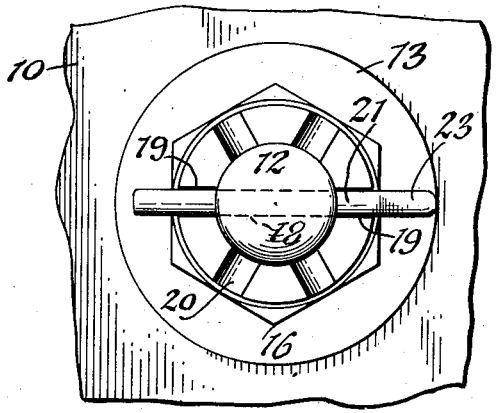
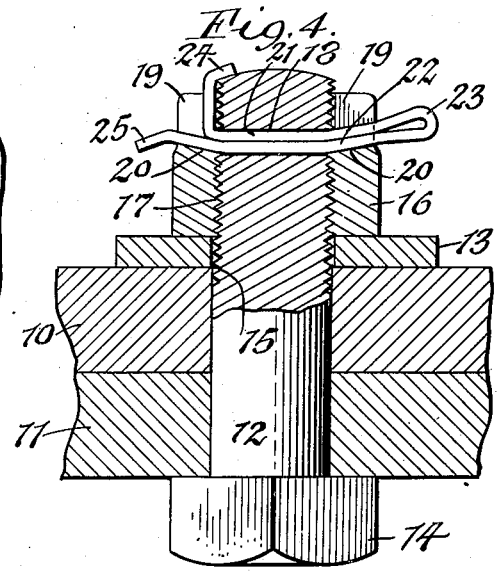
Norman J. Weiser INVENTOR.
BY Popp & Popp
ATTORNEYS Patented Oct. 17, 1944

2,360,626

UNITED STATES PATENT OFFICE 2,360,626

COTTER PIN CONNECTION FOR NUTS AND BOLTS

Norman J. Weiser, Buffalo, N. Y.

Application May 9, 1944, Serial No. 534,749

2 Claims. (Cl. 151—5)

This invention relates to a screw nut which is adapted to be interlocked with a screw bolt so as to prevent easy separation of the same, and more particularly to a castellated screw nut which is adapted to be secured against turning on a bolt by driving a cotter pin through a pair of notches in the outer end of the nut and through a transverse hole in the bolt.

With this end in view it is the object of this invention to so construct the screw nut that the cotter pin upon being driven through the nut and pin will be automatically deformed and thus held against easy displacement from the nut and bolt.

A further object of this invention is to provide a screw nut having this capacity which can be manufactured without any appreciable increase in cost above that of an ordinary castellated screw nut.

In the accompanying drawing:

Fig. 1 is a vertical section showing parts connected by a nut, bolt and cotter pin embodying this invention and viewing the cotter pin from a side thereof.

Fig. 2 is a similar section viewing the cotter pin from an end thereof.

Fig. 3 is a top plan view of the same.

Fig. 4 is a view similar to Fig. 1, but showing the screw nut and a part of the bolt in section, and also showing the cotter pin bent into its locked position.

In the following description similar reference characters indicate like parts in the several views of the drawing.

The numerals 10, 11 represent two boards or plates as an example of parts which may be connected by the fastening embodying this invention. This fastening includes a screw bolt having a body or shank 12 passing through the boards or plates and a washer 13 on the side of the plate 10 and having a head 14 at one end engaging the outer side of the plate 11, while its opposite end is provided with an external screw thread 15.

The numeral 16 represents a screw nut having its longitudinal opening or bore provided with an internal screw thread 17 which engages with the thread of the bolt shank while its inner or rear end bears against the outer side of the washer or other part of the assembly to be clamped.

Locking means are provided whereby the bolt and nut after being assembled in the desired position are held against turning relative to one another. These locking means embody the present invention and are preferably constructed as follows:

The numeral 18 represents a locking hole extending diametrically through the shank of the bolt and the screw thread on the periphery thereof.

On its outer end the screw nut is provided with an annular row of locking notches, slots or recesses 19 each of which is preferably open at its front end and extends radially from the periphery of the nut body to the thread on the bore or longitudinal opening of the same, so that the screw nut as a whole is of castellated form. These locking notches form pairs, the members of each pair being arranged on diametrically opposite sides of the nut and in line with each other. The bottom 20 of each of the locking notches is inclined and slopes from the high outer side or peripheral portion of the nut body downwardly and inwardly to the low inner side or threaded bore portion of the nut, so that the bottoms of the companion notches of a pair together form a bearing face which is generally of convex form, as best shown in Fig. 4.

For the purpose of interlocking the screw nut and screw bolt so that the same cannot turn relative to each other, the nut is turned into a position in which a pair of its diametrically opposite notches register with opposite ends of the locking opening or hole in the shank of the bolt and then a locking pin is passed crosswise through the respective pair of locking notches in the nut and the locking hole in the bolt shank. The locking pin is preferably of the cotter type which has two longitudinal legs 21, 22 which are connected at one of their corresponding ends by a loop or eye 23 while their opposite ends are disconnected.

The length of the screw nut and the location of the bolt hole is such that when the inner end of the nut bears against the outer side of the washer the outer high ends of the locking notches of the nut are arranged above or outwardly to some extent from the inner side of the hole in the bolt shank.

Upon driving a cotter pin with its disconnected ends foremost through a pair of such registering notches in the nut and the hole in the bolt shank that part of the cotter pin legs within the hole of the bolt shank will be arranged at right angles to the axis of the bolt and nut and those parts of these legs within the notches of the screw nut will be bent upwardly or outwardly relative to the axis of the bolt by the wedging or cam action of the inclined bottoms 20 of the notches on the legs of the cotter pin, as shown in Figs. 1 and 4, thereby deforming the legs of the cotter pin and causing the same to bind in the screw nut and screw bolt, whereby the cotter pin is frictionally retained in the hole of the bolt shank and the respective notches of the castellated screw nut.

If desired each withdrawal of the cotter pin from the engagement with the bolt shank and screw nut may be further prevented by bending the prongs or tips of the legs of the cotter pin in a direction lengthwise of the axis of the bolt and nut, as shown, for example, in Fig. 4, in which the prong or tip 25 of one leg of the cotter pin is bent downwardly toward the periphery of the nut and the prong or tip 25 of the other leg thereof is bent upwardly along the periphery and over the threaded end of the bolt shank in a manner similar to that practiced when using cotter pins in connection with ordinary castellated nuts and perforated bolts.

Preparatory to inserting a cotter pin through a pair of locking notches in the nut and the locking hole in the bolt shank the nut is first turned so as to bring the desired notches in line with said hole which can be done quickly and conveniently inasmuch as the hole in the bolt becomes visible before the nut has been fully tightened or pulled home. This is particularly advantageous when alining the notches of a nut and the hole of a bolt when the nut is somewhat oversized in height and the hole of the bolt is not fully exposed when the nut strikes its inner end against the member adapted to be engaged thereby. If the hole in the bolt appears through the notches in the nut before the latter has been actually pulled home it is only necessary to effect a partial further turn of the nut, say one-sixth of a turn at most, when three pairs of notches are employed, as shown in the drawing, in order to insure alinement of the desired notches and hole for cotter pin insertion.

Inasmuch as the outer ends of the locking notches are slightly higher at their outer ends than their inner ends, the inward inclination of the bottoms of these notches facilitates the guiding of the tips of the cotter pins into the holes of the bolts.

After the tips or prongs of the cotter pin have been started in the bolt hole a comparatively slight pressure against the eye or loop of the cotter pin will force the same through the bolt hole and cause the opposite end parts of the pin to be turned upwardly or outwardly by the inclined faces 20 at an angle to the axis of the bolt and nut while the central part of the pin is arranged at right angles to the axis of the bolt and nut. The frictional engagement of the cotter pin while thus partially deformed is sufficient to hold the same against being driven easily backwardly, thereby enabling the tips or prongs of the cotter pin to be readily spread into engagement with the adjacent surfaces of the nut and bolt without liability of pushing the cotter pin backwardly.

The inclined bottoms of each pair of locking notches are preferably curved from the same center, thereby enabling both notches of a pair to be cut simultaneously on the same radius by a single rotary cutter, whereby the cost of manufacturing the same is materially reduced and expedited.

Due to the deformation of the cotter pin upon inserting the same in the hole of the bolt, a tight assembly of the same with the nut and bolt is obtained which prevents the pin from vibrating and rattling and possibly becoming loose and lost, which features are particularly desirable in the automotive field and the aircraft industry.

Ready access to the cotter hole in the bolt will also be appreciated when making repairs to automobiles in situations where sighting the cotter hole is often very difficult.

I claim as my invention:

1. The combination of a screw bolt having a transverse hole, a screw nut applied to said bolt and provided on an end thereof with a notch the bottom of which inclines from a high outer part of the nut to a low inner part thereof, and a cotter pin driven through said notch and hole and deformed by engagement with said inclined bottom and operating to hold said bolt and nut against turning relative to each other.

2. The combination of a screw bolt having a hole extending crosswise through the thread of the bolt, a screw nut applied to said bolt and having a body which is provided on its front end with notches on diametrically opposite sides thereof, each notch having a bottom inclining from a high outer part at the periphery of the nut to a low inner part at the bore of the nut, and a cotter pin driven transversely through said notches in said nut and the hole in said bolt, the cotter pin being deformed at its ends by engagement with the inclined bottoms of said notches for holding said bolt and nut against rotation relative to each other and also preventing easy withdrawal of said cotter pin from said hole and notches.

NORMAN J. WEISER.